US012432818B1

(12) United States Patent
Zhao

(10) Patent No.: US 12,432,818 B1
(45) Date of Patent: Sep. 30, 2025

(54) ELECTRONIC COMBUSTION DEVICE

(71) Applicant: KNT RC ELECTRONICS LIMITED, Hongkong (CN)

(72) Inventor: Xiaojie Zhao, Guangdong (CN)

(73) Assignee: KNT RC ELECTRONICS LIMITED, Hongkong (CN)

( * ) Notice: Subject to any disclaimer, the term of this patent is extended or adjusted under 35 U.S.C. 154(b) by 0 days.

(21) Appl. No.: 19/218,268

(22) Filed: May 24, 2025

(51) Int. Cl.

| | |
|---|---|
| ***H05B 3/00*** | (2006.01) |
| ***F23D 3/16*** | (2006.01) |
| ***F23Q 25/00*** | (2006.01) |

(52) U.S. Cl.
CPC ............. *H05B 3/0019* (2013.01); *F23D 3/16* (2013.01); *F23Q 25/00* (2013.01)

(58) Field of Classification Search
CPC ......... H05B 3/0019; F23Q 25/00; F23Q 2/16; F23Q 3/00; F23Q 3/006; F23Q 23/10; F21V 35/003; F21V 25/02; H04L 12/40013; H04L 12/40091; H04L 12/282; F23D 3/16; F23D 3/18; F23D 3/02; F23D 3/26; F23N 5/265; F23N 5/242; F23N 1/005
See application file for complete search history.

(56) References Cited

U.S. PATENT DOCUMENTS

| | | | | |
|---|---|---|---|---|
| 10,655,843 | B2 * | 5/2020 | Bianchini | F23Q 23/10 |
| 11,378,272 | B2 * | 7/2022 | Bianchini | F23N 5/265 |
| 11,499,710 | B2 * | 11/2022 | Li | F23Q 25/00 |
| 2023/0313991 | A1 * | 10/2023 | Riga | F23D 3/30<br>431/33 |

* cited by examiner

*Primary Examiner* — Alfred Basichas
(74) *Attorney, Agent, or Firm* — Hawaii Patent Services; Nathaniel K. Fedde; Kenton N. Fedde

(57) ABSTRACT

Disclosed is an electronic combustion device, including a candle holder assembly, a combustion assembly, and a light-transmitting cup. The candle holder assembly includes a candle holder base, and a control circuit board and a fan. The fan blows air towards the combustion assembly to extinguish the combustion assembly. The combustion assembly is detachably connected to the candle holder assembly, the light-transmitting cup is connected to the candle holder assembly and surrounds the combustion assembly, a limiting portion is further arranged at a top of the light-transmitting cup, and the limiting portion abuts against a top edge of the container cup. The electronic combustion device achieves stability and reliability of connection between the combustion assembly and the candle holder assembly, retains replaceability of the combustion assembly, and reduces the risk of falling of the combustion assembly. Automatic extinguishing and more convenient and intelligent use are achieved.

10 Claims, 7 Drawing Sheets

ELECTRONIC COMBUSTION DEVICE

TECHNICAL FIELD

The present disclosure relates to the technical field of electronic burners, and in particular to an electronic combustion device for an aroma diffuser or candle.

BACKGROUND

A conventional candle or aroma diffuser generally includes a wax block and a wick embedded in the wax block, where the wick transports wax oil to sustain combustion, which achieves illumination or fragrance release. The conventional candle or aroma diffuser usually has defects such as inconvenient ignition, unstable placement, and lower safety. With technological advancements, some electronic candle holders that are electronically ignited have emerged in the market. An electronic candle holder mainly includes a holder, a wax block placed inside the holder, and a wick inside the wax block, where the wax block contains essential oils for emitting fragrance. Before use, a candle is placed in a desired position and ignited, and the holder is placed stably, which prevents melted wax from spilling out during combustion and protects the wax block to some extent.

In the prior art, a support base is detachably connected to a candle body, and the support base adapts to different candle bodies, thereby achieving convenience of reusing the support base, and saving costs.

However, the above scented candle design has the following defects: the support base and the candle body are electrically connected through an elastic column, such that the candle body is easily detached from the support base during movement, and the candle body may fall off, thereby posing safety hazards.

SUMMARY

In order to overcome the defects in the prior art, the present disclosure provides an electronic combustion device, with an aim to solve the technical problem of safety hazards caused by easy detachment between a main body and a base of an aroma diffuser or candle in the prior art.

To achieve the above objective, the present disclosure adopts the following technical solution:

An electronic combustion device is provided in an example of the present disclosure, including: a candle holder assembly, a combustion assembly, and a light-transmitting cup;

- the candle holder assembly includes: a candle holder base, and a control circuit board and a fan arranged inside the candle holder base, the candle holder base is provided with an air inlet and an air outlet, and the control circuit board is provided with a control button and a plurality of elastic columns; the fan is electrically connected to the control circuit board, an intake end of the fan is butt-jointed with the air inlet, an exhaust end of the fan is butt-jointed with the air outlet, and the fan is configured to blow air towards the combustion assembly to extinguish the combustion assembly;
- the combustion assembly is detachably connected to the candle holder assembly, the combustion assembly includes a container cup, a combustible wick arranged at a middle of the container cup, and a combustion agent filled inside the container cup; the combustion assembly is further provided with a plurality of electrical connection columns that abut against the elastic columns; and
- the light-transmitting cup is connected to the candle holder assembly and surrounds the combustion assembly, a limiting portion is further arranged at a top of the light-transmitting cup, and the limiting portion abuts against a top edge of the container cup.

An air duct is formed by enclosing an inner wall of the light-transmitting cup and an outer wall of the container cup, the air outlet is communicated with the air duct, an air guide vent communicated with the air duct is further arranged at the top of the light-transmitting cup and/or the container cup, and the air guide vent faces the combustible wick.

The electronic combustion device further includes a light sensor, the light sensor is electrically connected to the control circuit board, and the light sensor is configured to detect a burning or extinguishing state of the combustion assembly.

The control circuit board is provided with a remote signal receiver, and the remote signal receiver is configured to receive external remote control signals.

The elastic columns include a power-supply elastic column configured for supplying power to the combustible wick, a light-sensitive elastic column configured for supplying power to the light sensor, a signal-based elastic column configured for transmitting detection signals from the light sensor, and a state-detection elastic column configured for detecting an assembly state of the light-transmitting cup and the candle holder assembly.

The combustible wick includes a positive electrode needle, a negative electrode needle, and a combustible core located between the positive electrode needle and the negative electrode needle, where bottoms of the positive electrode needle and the negative electrode needle are connected to the power-supply elastic column.

At least one snap-fit bump structure is arranged on an inner wall of a lower end opening of the light-transmitting cup, the candle holder assembly is provided with a snap-fit groove structure corresponding to the snap-fit bump structure, and the light-transmitting cup is detachably connected to the candle holder assembly through the snap-fit bump structure and the snap-fit groove structure.

The light-transmitting cup includes an outer cup body with a top opening and a bottom opening, and an annular wall extending inward from an edge of the top opening, the annular wall is provided with the limiting portion, and the limiting portion abuts against the top edge of the container cup.

The candle holder base is further provided with an air guide member, an air guide channel is arranged inside the air guide member, an inlet end of the air guide channel is connected to the exhaust end of the fan, and an outlet end of the air guide channel is communicated with the air duct.

A battery is further arranged inside the candle holder base, and the battery is electrically connected to the control circuit board.

In the electronic combustion device of the present disclosure, the light-transmitting cup is additionally arranged outside the combustion assembly, and the limiting portion of the light-transmitting cup abuts against the container cup of the combustion assembly, which achieves stability and reliability of connection between the combustion assembly and the candle holder assembly, retains replaceability of the combustion assembly, and reduces the risk of falling of the combustion assembly. Moreover, the fan is further arranged inside the candle holder assembly, and the fan is controlled to blow air towards the combustible wick to automatically extinguish the combustion assembly, such that automatic ignition or extinguishing of the electronic combustion device, and also more convenient and intelligent use are achieved.

The above description is merely a summary of the technical solution of the present disclosure. In order to have a clearer understanding of the technical means of the present disclosure, the content of the specification may be referred to for implementation. To make the above and other objectives, features and advantages of the present disclosure apparent and understandable, the following preferred examples are detailed as follows.

Figure 1:
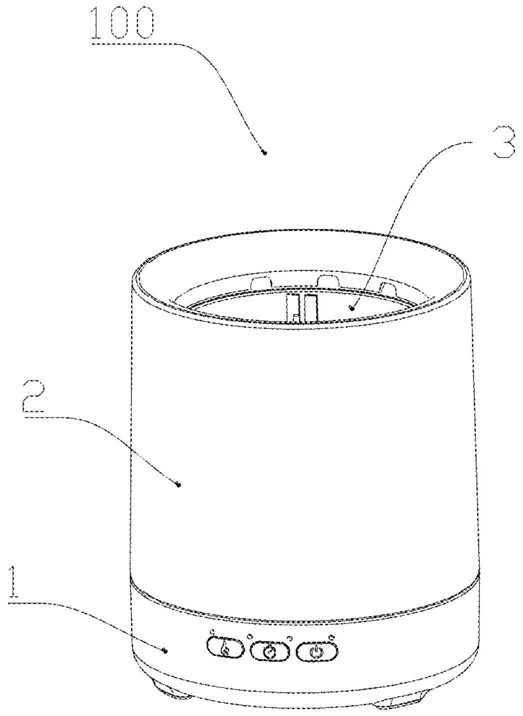
FIGS. 1-4 are schematic diagrams of different views of an overall structure of an electronic combustion device according to an example of the present disclosure.
Figure 2:
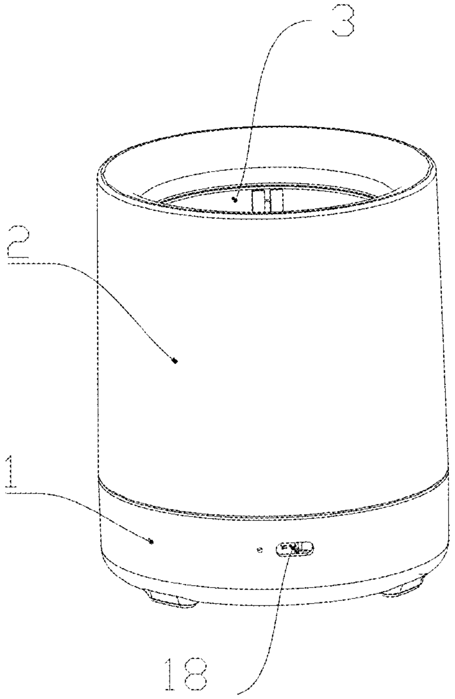

REFERENCE NUMERALS IN THE FIGURES electronic combustion device 100, candle holder assembly 1, air inlet 101, air outlet 102, lower housing 111, upper housing 112, snap-fit slot structure 113, positioning column 114, candle holder base 11, fan 12, air guide member 13, battery 14, control circuit board 15, control button 16, elastic column 17, charging port 18, remote signal receiver 151, light sensor 152, light-transmitting cup 2, outer cup body 21, annular wall 22, snap-fit bump structure 23, air duct 24, air guide vent 201, limiting portion 202, combustion assembly 3, container cup 31, external thread 311, combustion agent 32, combustible wick 33, positive electrode needle 331, negative electrode needle 332, combustible core 333, base 34, positioning hole 341, first electrical connection column 35, second electrical connection column 36, third electrical connection column 37, and fourth electrical connection column 38.

DETAILED DESCRIPTIONS OF THE EMBODIMENTS

In order to make objectives, technical solutions and advantages of the present disclosure clearer, the present disclosure will be described in further detail below with reference to the accompanying drawings and specific embodiments.

The technical solutions in the examples of the present disclosure will be clearly and completely described below in combination with the accompanying drawings in the examples of the present disclosure. Apparently, the examples described are merely some rather than all of the examples of the present disclosure. Based on the examples of the present disclosure, all other examples obtained by those skilled in the art without making creative efforts shall fall within the protection scope of the present disclosure.

In the description of the present disclosure, it is to be understood that the terms "central", "longitudinal", "transverse", "length", "width", "thickness", "upper", "lower", "front", "rear", "left", "right", "vertical", "horizontal", "top", "bottom", "inner", "outer", "clockwise", "counter-clockwise", etc. indicate azimuthal or positional relations based on those shown in the accompanying drawings only for ease of description of the present disclosure and for simplicity of description, and are not intended to indicate or imply that the referenced device or element must have a particular orientation and be constructed and operative in a particular orientation, and thus may not be interpreted as a limitation on the present disclosure.

Furthermore, the terms "first" and "second" are merely for the purpose of description, and cannot be construed as indicating or implying relative importance or implicitly specifying the number of technical features indicated. Thus, a feature defined with "first" and "second" may explicitly or implicitly include one or more of the features. In the description of the present disclosure, "a plurality of" means two or more, unless expressly specified otherwise.

In the present disclosure, unless otherwise explicitly specified and defined, the terms "mounting", "connecting", "connection", "fixing", etc. should be understood in a broad sense, for example, they may be a fixed connection, a detachable connection, or an integrated connection; may be a mechanical connection, or an electrical connection; may be a direct connection, or an indirect connection via an intermediate medium; and may be communication inside two elements, or an interactive relation between two elements. For those skilled in the art, the specific meanings of the terms described above in the present disclosure may be interpreted according to specific circumstances.

In the present disclosure, unless otherwise expressly stated and defined, a first feature being "above" or "below" a second feature may include the first and second features being in direct contact or that the first and second features being not in direct contact but being in contact by means of additional features between the first and second features. In addition, the first feature being "over", "above" and "on the top of" the second feature includes that the first feature is over and above the second feature, or simply means that the level of the first feature is higher than that of the second feature. The first feature being "under", "below" and "at the bottom of" the second feature includes that the first feature is under and below the second feature, or simply means that the level of the first feature is lower than that of the second feature.

In the description of the present specification, the description of reference terms such as "one embodiment", "some embodiments", "example", "specific example" or "some examples" means that specific features, structures, materials or characteristics described in combination with the embodiment or example are included in at least one embodiment or example of the present disclosure. In the present specification, the schematic description of the above terms should not be construed as necessarily referring to the same embodiment or example. Moreover, the specific features, structures, materials or characteristics described may be combined in a suitable manner in any one or more embodiments or examples.

A conventional candle or aroma diffuser generally includes a wax block and a wick embedded in the wax block, where the wick transports wax oil to sustain combustion, which achieves illumination or fragrance release. The conventional candle or aroma diffuser usually has defects such as inconvenient ignition, unstable placement, and lower safety. With technological advancements, some electronic candle holders that are electronically ignited have emerged in the market. An electronic candle holder mainly includes a holder, a wax block placed inside the holder, and a wick inside the wax block, where the wax block contains essential oils for emitting fragrance. Before use, a candle is placed in a desired position and ignited, and the holder is placed stably, which prevents melted wax from spilling out during combustion and protects the wax block to some extent.

In the prior art, a support base is detachably connected to a candle body, and the support base adapts to different candle bodies, thereby achieving convenience of reusing the support base, and saving costs.

However, the above scented candle design has the following defects: the support base and the candle body are electrically connected through an elastic column, such that the candle body is easily detached from the support base during movement, and the candle body may fall off, thereby posing safety hazards. In order to solve the above problems, an electronic combustion device 100 that improves stability of connection between a combustion assembly and a candle holder assembly is disclosed in this example.

With reference to FIGS. 1-15, an electronic combustion device 100 is disclosed in this example, including: a candle holder assembly 1, a combustion assembly 3, and a light-transmitting cup 2;

- the candle holder assembly 1 includes: a candle holder base 11, and a control circuit board 15 and a fan 12 arranged inside the candle holder base 11, the candle holder base 11 is provided with an air inlet 101 and an air outlet 102, and the control circuit board 15 is provided with a control button 16 and a plurality of elastic columns 17; the fan 12 is electrically connected to the control circuit board 15, an intake end of the fan 12 is butt-jointed with the air inlet 101, an exhaust end of the fan 12 is butt-jointed with the air outlet 102, and the fan 12 is configured to blow air towards the combustion assembly 3 to extinguish the combustion assembly 3 in a burning state;
- the combustion assembly 3 is detachably connected to the candle holder assembly 1, the combustion assembly 3 includes a container cup 31, a combustible wick 33 arranged at a middle of the container cup 31, and a combustion agent 32 filled inside the container cup 31, where the combustible wick 33 is embedded in the combustion agent 32; the combustion assembly 3 is further provided with a plurality of electrical connection columns that abut against the elastic columns 17; and
- the light-transmitting cup 2 is connected to the candle holder assembly 1 and encloses the combustion assembly 3, a limiting portion 202 is further arranged at a top of the light-transmitting cup 2, and the limiting portion 202 abuts against a top edge of the container cup 31.

In the electronic combustion device 100 in this example, the light-transmitting cup 2 is additionally arranged outside the combustion assembly 3, the light-transmitting cup 2 does not obstruct light emitted by the combustion assembly 3, the limiting portion 202 is arranged on the light-transmitting cup 2, and when the light-transmitting cup 2 is assembled to the candle holder assembly 1, the limiting portion 202 abuts against a top edge of the combustion assembly 3, which secures an originally unstable connection between the candle holder assembly 1 and the combustion assembly 3, facilitates movement by the user, and prevents safety hazards caused by detachment of the combustion assembly 3. To replace the combustion assembly 3, the light-transmitting cup 2 needs to be removed first.

It is to be noted that the electronic combustion device 100 in this example may utilize combustion agents in a solid, semi-solid, or liquid state for combustion. The combustion agents generally include wax oil, aromatic gel, or aromatic liquid, or the like.

Figure 3:
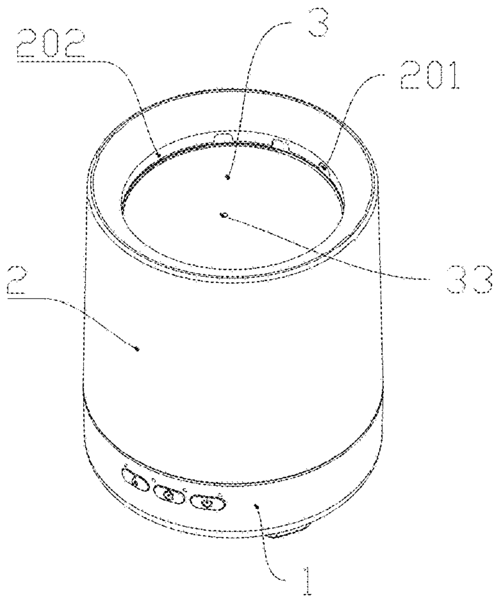
Figure 4:
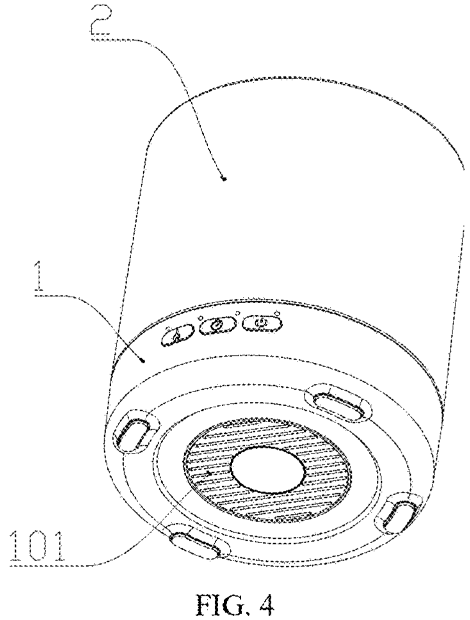
Figure 5:
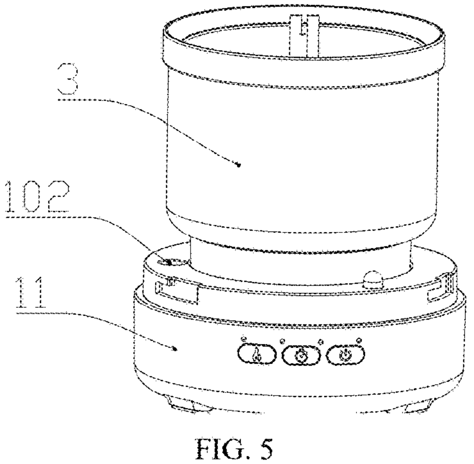
FIG. 5 is a schematic structural diagram of an electronic combustion device with a light-transmitting cup removed according to an example of the present disclosure.
Figure 6:
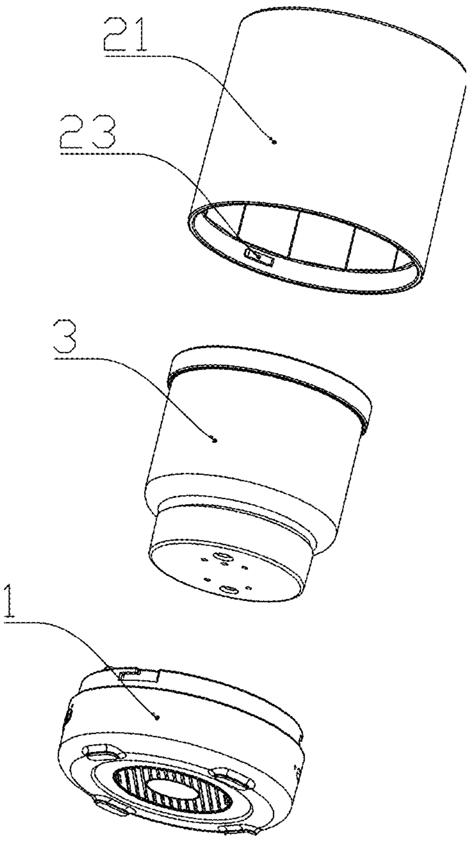
FIG. 6 is an exploded view of an electronic combustion device according to an example of the present disclosure.
Figure 7:
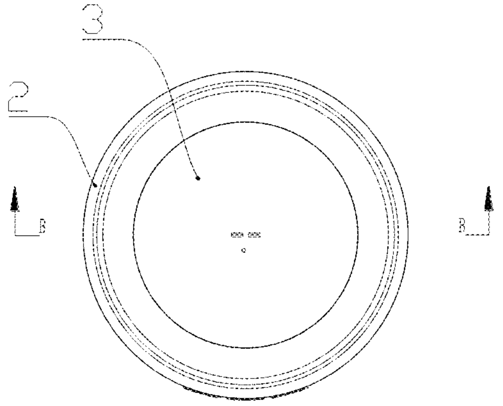
FIG. 7 is a top view of an electronic combustion device according to an example of the present disclosure.
Figure 8:
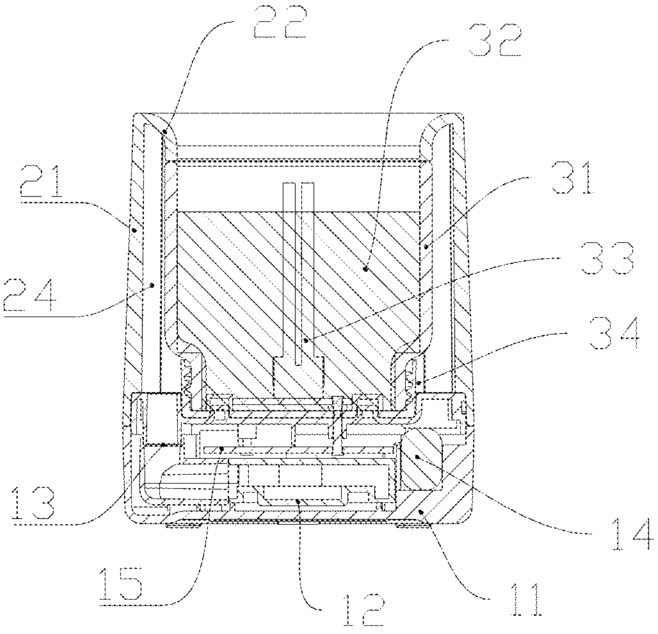
FIG. 8 is a sectional view of FIG. 7 in a B-B direction.
Figure 9:
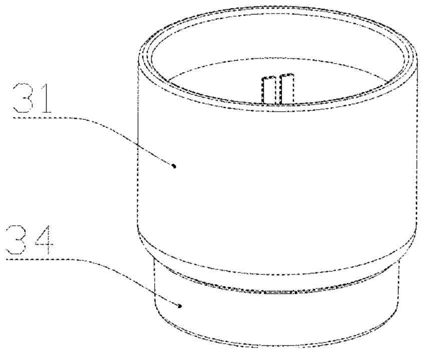
FIGS. 9 and 10 are schematic structural diagrams of different views of a combustion assembly of an electronic combustion device according to an example of the present disclosure.

With reference to FIGS. 3 and 8, an air duct 24 is formed by enclosing an inner wall of the light-transmitting cup 2 and an outer wall of the container cup 31, the air outlet 102 is communicated with the air duct 24, an air guide vent 201 communicated with the air duct 24 is further arranged at the top of the light-transmitting cup 2 and/or the container cup 31, and the air guide vent 201 faces the combustible wick 33. That is, air from the fan 12 flows through the air duct 24 and is blown towards the combustible wick 33 from the air guide vent 201.

In this example, the air duct 24 is of an annular cavity structure formed between the light-transmitting cup 2 and the container cup 31, which simplifies the structural design without need of a separately designed air duct. To extinguish the combustible wick 33 of the combustion assembly 3, the fan 12 is controlled to start blowing air towards the combustible wick 33 of the combustion assembly 3, and then the combustible wick 33 is extinguished. Compared to the prior art, the electronic combustion device 100 in this example extinguishes the combustion assembly 3 through the fan 12, and compared to manual extinguishing by the user with his/her mouth, automatic extinguishing of the combustible wick 33 is achieved, which offers a better and safer user experience.

With reference to FIGS. 12-14 again, the candle holder assembly 1 includes a candle holder base 11, a mounting cavity is formed inside the candle holder base 11, and the control circuit board 15 and the fan 12 are arranged inside the mounting cavity. Specifically, the fan 12 is arranged at a bottom of the mounting cavity, the air inlet 101 is arranged at a bottom of the candle holder base 11, and the intake end of the fan 12 is butt-jointed with the air inlet 101. The fan 12 and the control circuit board 15 are fixedly connected to the candle holder base 11 by means of screws.

The candle holder base 11 includes: a lower housing 111 and an upper housing 112 connected to the lower housing 111, and the air inlet 101 is arranged at a bottom of the lower housing 111. The upper housing 112 is provided with the air outlet 102. The upper housing 112 and the lower housing 111 are connected in a screwed or snap-fitted manner, the control circuit board 15 is provided with electronic components that form a control circuit, the elastic columns 17 are welded to the control circuit board 15, and elastic ends of the elastic columns 17 extend from the upper housing 112 to be butt-jointed with the combustion assembly 3.

The control button 16 is electrically connected to the control circuit board 15, an operating end of the control button 16 extends from a side wall of the candle holder base 11, the control button 16 includes a switch button, a duration setting button, and the like, and when the user presses the switch button, the control circuit board 15 receives an input control signal, and controls the combustible wick 33 to produce an electric arc or spark to ignite the combustion assembly 3. When the user presses the switch button again, the control circuit board 15 controls the fan 12 to blow air towards the combustible wick 33, so as to extinguish the combustible wick 33. The duration setting button is configured for the user to input an operational duration of starting the electronic combustion device 100, the operational duration in hours or minutes may be preset based on actual needs, and upon expiry of the preset operational duration, the fan 12 is controlled to start extinguishing the combustible wick 33.

To ensure rapid aligned connection between the combustion assembly 3 and the candle holder assembly 1, a butt-joint groove is formed at a top of the candle holder assembly 1, a butt-joint face is arranged at a bottom of the combustion assembly 3, two positioning columns 114 protrude from a bottom of the butt-joint groove, and corresponding positioning holes 341 are recessed on the butt-joint face of the combustion assembly 3.

In this example, the electronic combustion device 100 further includes a light sensor 152, the light sensor 152 is electrically connected to the control circuit board 15, and the light sensor 152 is configured to detect a burning or extinguishing state of the combustion assembly 3. This light sensor 152 may be arranged on the light-transmitting cup 2 and transmits light detection signals to the control circuit board 15, and the control circuit board 15 determines whether to actively ignite or extinguish the combustible wick 33 according to a current operating state.

Further, the control circuit board 15 is provided with a remote signal receiver 151, and the remote signal receiver 151 is configured to receive external remote control signals. The remote signal receiver 151 may be an infrared receiver configured for receiving external remote control signals, which enables remote control of the electronic combustion device 100, and further enhances operational convenience.

Figure 10:
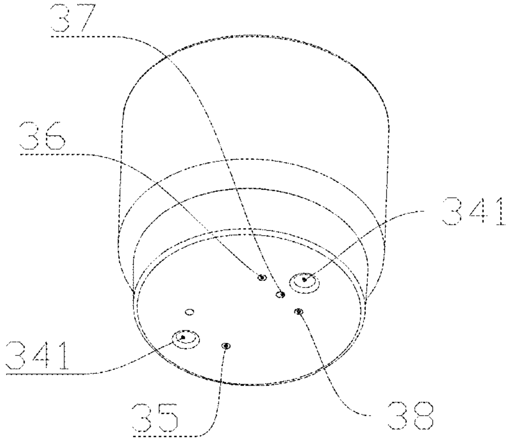
Figure 11:
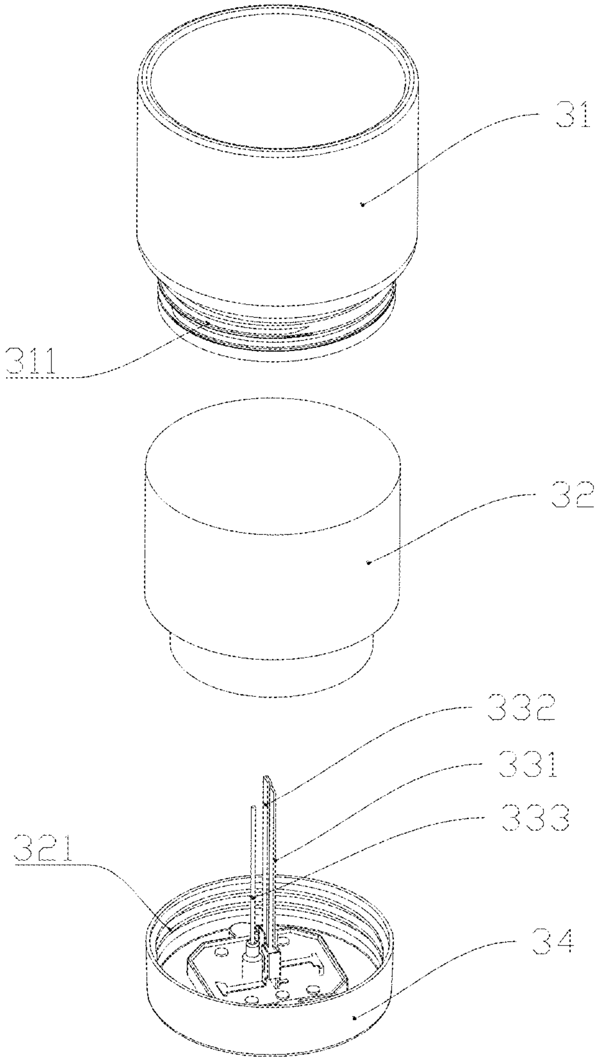
FIG. 11 is an exploded view of a combustion assembly of an electronic combustion device according to an example of the present disclosure.
Figure 12:
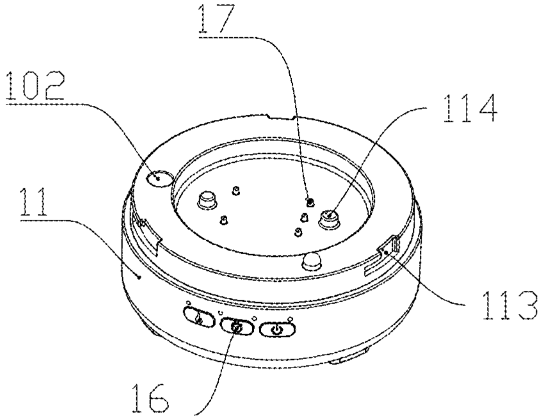
FIGS. 12 and 13 are schematic structural diagrams of different views of a candle holder assembly of an electronic combustion device according to an example of the present disclosure.
Figure 13:
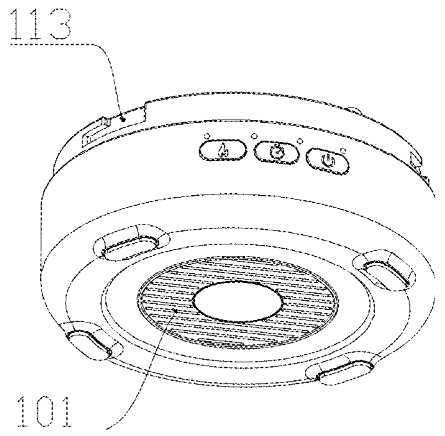

The elastic columns 17 include a power-supply elastic column configured for supplying power to the combustible wick 33, a light-sensitive elastic column configured for supplying power to the light sensor, a signal-based elastic column configured for transmitting detection signals from the light sensor, and a state-detection elastic column configured for detecting an assembly state of the light-transmitting cup 2 and the candle holder assembly 1. Specifically, as shown in FIG. 10, the corresponding electrical connection columns include a first electrical connection column 35 in elastic contact with the power-supply elastic column, a second electrical connection column 36 in elastic contact with the light-sensitive elastic column, a third electrical connection column 37 electrically connected the signal-based elastic column, and a fourth electrical connection column 38 electrically connected to the state-detection elastic column. The light sensor is arranged close to the combustible wick 33, and the control circuit board 15 and the light sensor are located inside the combustion assembly 3 and the candle holder assembly 1 respectively, thereby necessitating the arrangement of butt-joint terminals for supplying power to the light sensor and achieving signal transmission. Additionally, the combustible wick 33 is an electronic wick, and a closed power supply circuit is formed through butt-jointed connection between the power-supply elastic column and the first electrical connection column 35.

With reference to FIG. 11 again, the combustible wick 33 includes a positive electrode needle 331, a negative electrode needle 332, and a combustible core 333 located between the positive electrode needle 331 and the negative electrode needle 332, where bottoms of the positive electrode needle 331 and the negative electrode needle 332 are connected to the power-supply elastic column. The combustible core 333 may be made of cotton or any other flammable material, the positive electrode needle 331 and the negative electrode needle 332 may be composed of rigid combustible sheets and printed circuits on surfaces thereof, the combustible core 333 in a burning state releases heat and burns away the rigid combustible sheets of the positive electrode needle 331 and the negative electrode needle 332 located on one side thereof, and the printed circuits are heated and melt at high temperatures. The advantages of such design lie in that the positive electrode needle 331 and the negative electrode needle 332 are burnt synchronously with the combustible core 333, such that end portions of the three remain at a roughly equal height, which enables quicker re-ignition of the combustion assembly 3.

With reference to FIGS. 7 and 12 again, at least one snap-fit bump structure 23 is arranged on an inner wall of a lower end opening of the light-transmitting cup 2, the candle holder assembly 1 is provided with a snap-fit slot structure 113 corresponding to the snap-fit bump structure 23, and the light-transmitting cup 2 is detachably connected to the candle holder assembly 1 through the snap-fit bump structure 23 and the snap-fit slot structure 113. The snap-fit slot structure 113 is an L-shaped slot circumferentially formed on an outer wall of the candle holder base 11, a notch is formed in an axial direction of the L-shaped slot, and the snap-fit bump structure 23 is first inserted axially into the snap-fit slot structure 113 and then rotated for snap-fitted connection and fixing of the two. To disassemble the light-transmitting cup 2 and the candle holder assembly 1, reverse operations are performed.

With reference to FIGS. 6 and 8 again, the light-transmitting cup 2 includes an outer cup body 21 with a top opening and a bottom opening, and an annular wall 22 extending inward from an edge of the top opening, the annular wall 22 is provided with the limiting portion 202, and the limiting portion 202 abuts against the top edge of the container cup 31. The outer cup body 21 and the annular wall 22 are integrally formed. The air guide vent 201 may include a plurality of notches formed at the limiting portion 202 or notches formed at the top edge of the container cup 31, or through holes located at other positions of side walls of the annular wall 22 and/or the container cup 31. The air guide vent 201 directionally guides air from the air duct 24, i.e., guiding the output air to a position where the combustible core 333 is located to achieve rapid and precise extinguishing of the combustible wick 33.

With reference to FIGS. 8 and 14 again, the candle holder base 11 is further provided with an air guide member 13, an air guide channel is arranged inside the air guide member 13, an inlet end of the air guide channel is connected to the exhaust end of the fan 12, and an outlet end of the air guide channel is communicated with the air duct 24. It may be understood that in other examples, the air guide member 13 may be an air guide structure portion integrally formed inside the candle holder base 11, or the exhaust end of the fan 12 may be directly butt-jointed with the air duct 24.

Figure 14:
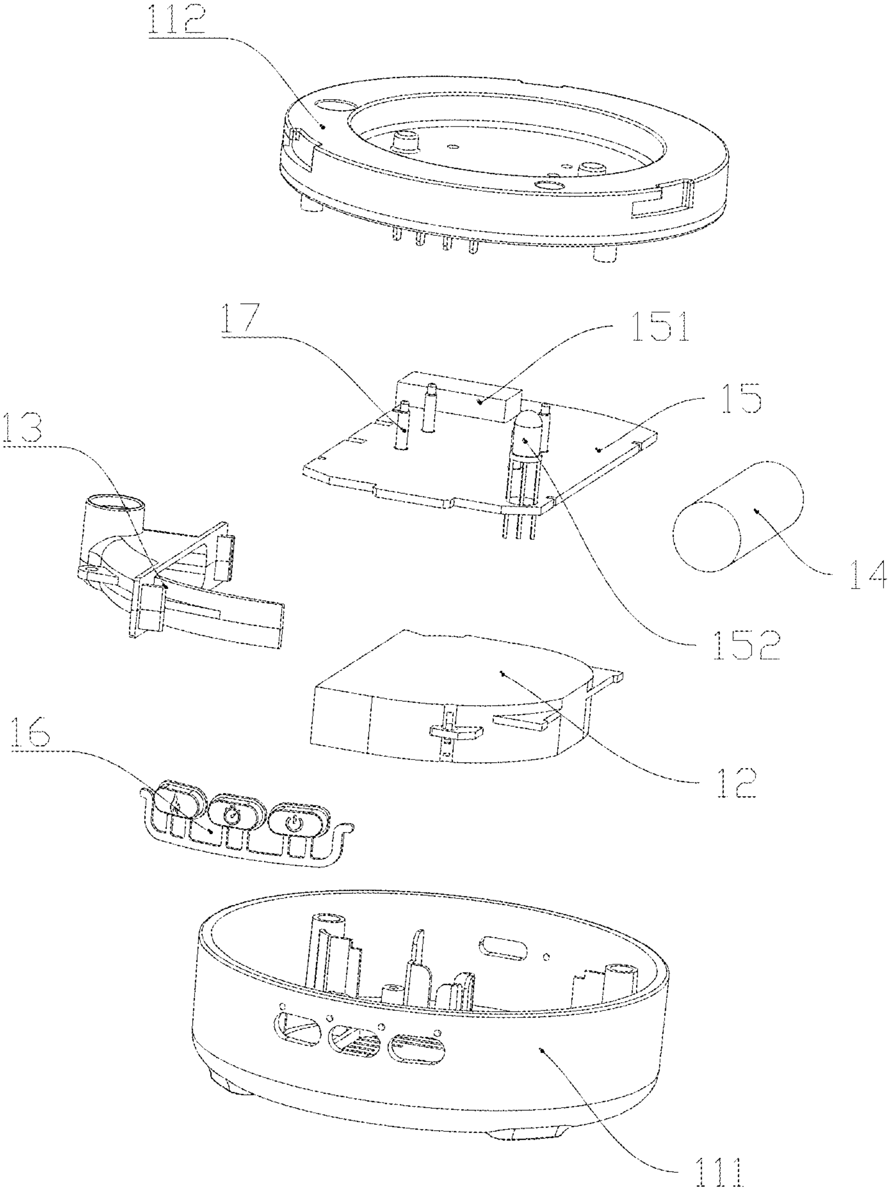
FIG. 14 is an exploded view of a candle holder assembly of an electronic combustion device according to an example of the present disclosure.
Figure 15:
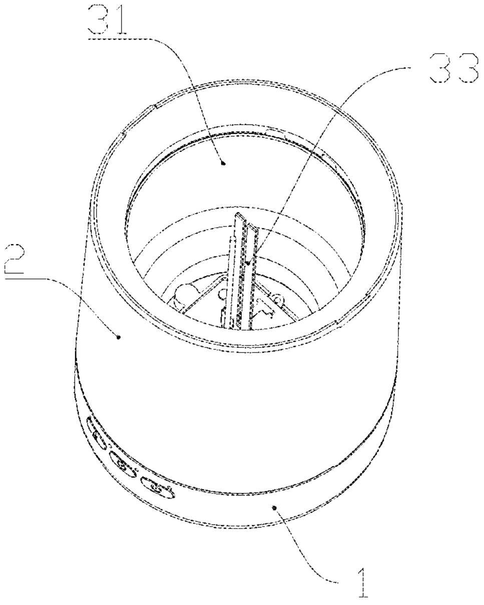
FIG. 15 is a schematic state diagram of an electronic combustion device with wax oil unfilled according to an example of the present disclosure.

As shown in FIG. 14, a battery 14 is further arranged inside the candle holder base 11, the battery 14 is electrically connected to the control circuit board 15, and the control circuit board 15 is further provided with a charging port 18 configured for charging the battery 14. In other examples, the battery 14 is alternatively not arranged for the electronic combustion device 100, and an external power source of the charging port 18 is directly used to supply power to the control circuit board 15.

With reference to FIG. 11 again, external threads 311 are arranged on an outer wall of a lower end of the container cup 31 of the combustion assembly 3, a bottom of the combustible wick 33 is fixed to a base 34, the base 34 is provided with internal threads corresponding to the external threads 311, and the base 34 is threadedly connected to the container cup 31.

It is to be noted that the combustion assembly 3 of the electronic combustion device 100 in this example is a consumable, the candle holder assembly 1 and the light-transmitting cup 2 are reusable, and the container cup 31 is alternatively made of a transparent material.

In the electronic combustion device of this example, the light-transmitting cup is additionally arranged outside the combustion assembly, and the limiting portion of the light-transmitting cup abuts against the container cup of the combustion assembly, which achieves stability and reliability of connection between the combustion assembly and the candle holder assembly, retains replaceability of the combustion assembly, and reduces the risk of falling of the combustion assembly. Moreover, the fan is further arranged inside the candle holder assembly, and the fan is controlled to blow air towards the combustible wick to automatically extinguish the combustion assembly, such that automatic ignition or extinguishing of the electronic combustion device, and also more convenient and intelligent use are achieved.

The above examples are only intended to further illustrate the technical content of the present disclosure and facilitate understanding by the readers, but it does not mean that the embodiments of the present disclosure are only limited thereto. Any technical extension or recreation made based on the present disclosure falls within the scope of protection of the present disclosure. The scope of protection of the present disclosure shall be governed by the appended claims.

What is claimed is:

1. An electronic combustion device, comprising: a candle holder assembly, a combustion assembly, and a light-transmitting cup;

the candle holder assembly comprises: a candle holder base, and a control circuit board and a fan arranged inside the candle holder base, the candle holder base is provided with an air inlet and an air outlet, and the control circuit board is provided with a control button and a plurality of elastic columns; the fan is electrically connected to the control circuit board, an intake end of the fan is butt-jointed with the air inlet, an exhaust end of the fan is butt-jointed with the air outlet, and the fan is configured to blow air towards the combustion assembly to extinguish the combustion assembly in a burning state;

the combustion assembly is detachably connected to the candle holder assembly, the combustion assembly comprises a container cup, a combustible wick arranged at a middle of the container cup, and a combustion agent filled inside the container cup, wherein the combustible wick is embedded in the combustion agent; the combustion assembly is further provided with a plurality of electrical connection columns that abut against the elastic columns; and the light-transmitting cup is connected to the candle holder assembly and surrounds the combustion assembly, a limiting portion is further arranged at a top of the light-transmitting cup, and the limiting portion abuts against a top edge of the container cup.

2. The electronic combustion device according to claim 1, wherein an air duct is formed by enclosing an inner wall of the light-transmitting cup and an outer wall of the container cup, the air outlet is communicated with the air duct, an air guide vent communicated with the air duct is further arranged at the top of the light-transmitting cup and/or the container cup, and the air guide vent faces a side of the combustible wick for air guide.

3. The electronic combustion device according to claim 2, wherein the candle holder base is further provided with an air guide member, an air guide channel is arranged inside the air guide member, an inlet end of the air guide channel is connected to the exhaust end of the fan, and an outlet end of the air guide channel is communicated with the air duct.

4. The electronic combustion device according to claim 2, wherein the electronic combustion device further comprises a light sensor, the light sensor is electrically connected to the control circuit board, and the light sensor is configured to detect a burning or extinguishing state of the combustion assembly.

5. The electronic combustion device according to claim 4, wherein the control circuit board is provided with a remote signal receiver, and the remote signal receiver is configured to receive external remote control signals.

6. The electronic combustion device according to claim 5, wherein the elastic columns comprise a power-supply elastic column configured for supplying power to the combustible wick, a light-sensitive elastic column configured for supplying power to the light sensor, a signal-based elastic column configured for transmitting detection signals from the light sensor, and a state-detection elastic column configured for detecting an assembly state of the light-transmitting cup and the candle holder assembly.

7. The electronic combustion device according to claim 6, wherein the combustible wick comprises a positive electrode needle, a negative electrode needle, and a combustible core located between the positive electrode needle and the negative electrode needle, wherein bottoms of the positive electrode needle and the negative electrode needle are connected to the power-supply elastic column.

8. The electronic combustion device according to claim 1, wherein at least one snap-fit bump structure is arranged on an inner wall of a lower end opening of the light-transmitting cup, the candle holder assembly is provided with a snap-fit groove structure corresponding to the snap-fit bump structure, and the snap-fit bump structure is detachably connected to the snap-fit groove structure.

9. The electronic combustion device according to claim 8, wherein the light-transmitting cup comprises an outer cup body with a top opening and a bottom opening, and an annular wall extending inward from an edge of the top opening, the annular wall is provided with the limiting portion, and the limiting portion abuts against the top edge of the container cup.

10. The electronic combustion device according to claim 1, wherein a battery is further arranged inside the candle holder base, and the battery is electrically connected to the control circuit board.

* * * * *